United States Patent [19]

Jutand et al.

[11] Patent Number: 4,942,549

[45] Date of Patent: Jul. 17, 1990

[54] RECURSIVE ADDER FOR CALCULATING THE SUM OF TWO OPERANDS

[75] Inventors: Francis Jutand, Cachan; Luc Montperrus, Ville D'Avray, both of France

[73] Assignee: Etat Francais represente par le Ministere des Postes, des Telecommunications et de l'Espace (CNET), Issy Les Moulineaux, France

[21] Appl. No.: 320,319

[22] Filed: Mar. 7, 1989

[30] Foreign Application Priority Data

Mar. 7, 1988 [FR] France .............................. 88 02867

[51] Int. Cl.$^5$ .............................................. G06F 7/50
[52] U.S. Cl. ..................................... 364/786; 364/787
[58] Field of Search ................ 364/784, 786, 787, 788

[56] References Cited

U.S. PATENT DOCUMENTS

| 4,623,982 | 11/1986 | Ware | 364/788 |
| 4,761,760 | 8/1988 | Tomoji | 364/788 |
| 4,763,295 | 8/1988 | Yamada et al. | 364/786 |

FOREIGN PATENT DOCUMENTS 0171805 8/1985 European Pat. Off. .

OTHER PUBLICATIONS

IEEE 1983 Proceedings of the 6th Symp. on Computer Arithmetic, 1983, (IEEE; S. Ong et al), "A Comparision of ALU Structures for VLSI Technology".
L'Onde Electrique, vol. 61, No. 1, Jan. 1981, (FR; J.-P. Vabre).

Primary Examiner—Gary V. Harkcom
Assistant Examiner—Tan V. Mai
Attorney, Agent, or Firm—Hayes, Soloway, Hennessey & Hage

[57] ABSTRACT

A recursive type adder for calculating the sum of two operands. It is used to calculate the sum of two binary data numbers using adders in the form of integrated circuits, particularly for information processing systems wherein the adders constitute one of the fundamental operations of data processing. The invention is classified in the category of parallel-parallel type adders.

4 Claims, 2 Drawing Sheets

RECURSIVE ADDER FOR CALCULATING THE SUM OF TWO OPERANDS

BACKGROUND OF THE INVENTION

1. Field of the Invention

The present invention concerns a recursive type adder for calculating the sum of two operands.

This invention is used to calculate the sum of two binary data numbers using adders in the form of integrated circuits, particularly for information processing systems wherein the adders constitute one of the fundamental operations of data processing.

The invention is classified in the category of parallel-parallel type adders. These allow addition of two operands A and B respectively comprised of binary data $a_1$, $a_2, \ldots, a_n$ and $b_1, b_2, \ldots, b_n$. The result is furnished in parallel binary form.

2. Description of the Related Art

Generally, a parallel-parallel adder comprises a complex association of interconnected elementary series adders. Each elementary adder receives two bits to be added, belonging to each of the operands or to the intermediate results effected by other elementary adders in the complex circuit. Each adder furnishes the binary result of one addition at one output but may also furnish, at two other outputs, two bits respectively termed propagation and generation bits.

The propagation bit $P_k$ furnished by one adder $AD_k$, of row k (full adder) in a range comprising K adders connected in series ($1 \leq k \leq K$), conforms to the relation $P_k = P_k \cdot P_{k-1} \ldots P_1$ with $P_k = a_k \oplus b_k$. In known manner, $\oplus$ designates exclusive operator XOR.

$a_k$ and $b_k$ respectively denote the input bits from row k, to be added.

If the sum effected by each elementary adder $AD_k$ of a row is designated by local addition, it is necessary to add two bits $a_k$ and $b_k$ belonging to the two operands A and B. Three situations may arise:

(1) if $a_k = b_k = 0$ no carry is generated by the elementary adder and if a carry comes from the adders in a row lower than k which effect addition of lower weight bits, this carry is then "trapped" by added $AD_k$. Thus, bit $S_k$ of impulse 2K of the sum is a logic 1;

(2) if $a_k = 0$ and $b_k = 1$ or $a_k = 1$ and $b_k = 0$, then no carry is generated locally, but a carry coming of lower weight is propagated towards the adder in row $k+1$, and $s_k = 0$. If not, $s_k$ remains equal to 1; and (3) if $a_k = b_k = 1$, a carry is generated locally by adder AD and this carry is transmitted towards the adder of upper row $k+1$.

In the same manner, the local generation function $g_k$ for adder $AD_k$ of row k obeys the relation $$g_k = a_k \cdot b_k.$$

This relationship of logic "·" corresponds to the logical function AND.

The generative function $G_k$ of an adder $AD_k$ corresponds to an output bit of this adder, equal to 1, each time a carry appears after addition. Propagation function $P_k$ corresponds to an output bit of this adder, equal to 1, when a carry originating from an adder of the preceding row $(k-1)$ must be propagated to the adder in the following row $(k+1)$.

Under these conditions, the base relation of carry $r_k$, calculated by a rapid parallel adder of row k, is written $$r_k = g_k + (P_k \cdot r_{k-1}).$$

In this equation the plus sign designates the logic operation OR.

The carry $r_k$ is produced by the addition of the first k bits of the two operands. This equation is valid for any value of k.

The final calculation of the sum $S_k$ is effected by a simple operator XOR $$S_k = P_k \oplus r_{k-1}.$$

In a series of k adders, $r_1$IN designates the input carry applied to the first adder in the series, and $r_K$OUT designates the output carry of the last adder in the series.

Parallel adders functioning on this principle and using series of elementary adders of the "full adder" type are described, for example, in the following articles:

(1) the publication IEEE TRANSACTIONS ON COMPUTERS—VOLUME C31, NO. 3, March 1982, pages 260-264—in an article entitled "Regular Layout for Parallel Adders";

(2) 1983—pages 10-16—in an article entitled "Comparison of ALU Structures for VLSI Technology";

(3) the book entitled "Circuits logiques de traitement numerique d'information" ["Logic Circuits for Digital Information Processing"]—CEPAUDES edition, ECOLE NATIONAL SUPERIEURE DE L'AERONQUTIQUE ET DE L'ESPACE [National College of Aeronautics and Space]—1979—Pages 185-289.

These publications describe complex circuits for elementary adders capable of effecting the sum of two binary operands.

The essential problem posed by complex adders comprised of "full adders" arises primarily from the fact that carrys are generated by certain adders and certain carrys must be propagated. Actually, any generation or propagation of a carry requires complex connections and supplementary circuits; in the case of an integrated circuit adder, these connections and these supplementary circuits affect not only the surface of the integrated circuit, but also its performance.

Among rapid parallel adders, one of the most frequently used is the "carry select adder". In this type of adder, which comprises at least one series of elementary full adders, two parallel carry calculations are effected. The first calculation is effected with the hypothesis of an input carry being equal to 1, while the second calculation is effected with the hypothesis of an input carry equal to zero. Thus, during addition, it is not necessary to know in advance what is the carry coming from the preceding bits in order to effect addition of the subsequent bits. When the carry is effectively determined calculations effected in each of the hypotheses, the result corresponding to the valid hypothesis is selected in the time necessary for the addition.

This type of adder, while having the disadvantage of doubling a portion of the material, as two parallel calculations are performed with different hypotheses, has the advantage of increasing calculation speed. Actually, when the input carry in the first adders of the series is not known, it is possible to gain time by virtue of the two hypotheses described above, by effecting the adding calculations during the time it takes for the input carry to arrive at the input of the series of adders.

In general, parallel adders may be one of two types: "repetitive" and "recursive" type adders. In both types of adders, propagation of the carry is the essential problem.

In a repetitive type adder, an adder for n bits is constructed by adding an elementary cell (full adder) to an adder already comprising n−1 elementary cells connected in series. This structure translates the relation of recurrence of addition. To increase the propagation speed of this type of adder, it is necessary to optimize only one propagation path for the carry. The classic examples of this type of adder is the Manchester carry chain adder.

In a recursive type adder, an n bit adder is subdivided into two n/2 bit adders. In this type of adder, the carry propagation time is theoretically Log(n)T, where T designates the propagation time for an elementary cell. This recursive structure is used primarily in series adders permitting distribution of the necessary information to the different cells in optimal time. This type adder is often called a "carry look ahead adder".

Generally, manufacturing these repetitive type adders requires less silicon, but they are slower than recursive type adders, which do use a great deal of silicon.

Besides repetitive and recursive embodiments, intermediate adaptations exist which are, in effect, compromise solutions. These compromise embodiments simultaneously take advantage of the repetitive aspect of adders because of its relatively few obstructions and the recursive aspect because of its speedy performance.

One of these known compromise embodiments is an optimal carry select adder. This embodiment consists of breaking the addition up into several segments. Hypotheses are formed for each of the segments, as indicated above, regarding the carry input for each segment. The carry input for each segment is determined more and more closely with the help of a series of cells which effect the logic operation $g \cdot r + p$; in this relation, g denotes a carry bit and p is a bit which indicates whether or not there is propagation of the bit. This type of adder may be termed a "$g \cdot r + p$ adder".

The adder wherein the carry input is equal to zero has for the carry output, the carry generated by the segment, designated by $G_t$.

The adder wherein the carry input is equal to 1 has its own calculated carry as the carry output. The propagation bit is equal to 1 and is designated by $P_t$ when there is propagation in the segment. If $r_{in}$ designates the real carry entering a segment, the carry output $r_{out}$ is obtained by the logic operation $r_{OUT} = G_t + P_t \cdot r_{IN}$.

Calculations are performed in parallel in the different segments and optimizing an adder of this type depends upon the number of bits which each segment must calculate to render all the propagation paths critical in a series structure adder of predetermined hierarchy. The definitions of critical pathways, the series structure and the hierarchical levels are described in the publications previously cited.

In an optimal carry select adder, the number of elementary addition cells may be progressively increased in each new segment, so that the calculation time necessary for one segment is equal to that of the preceding segment, increased by the selection time of the carry. In this case the result is an optimal carry select adder.

Another known compromise embodiment is the use of a carry skip adder. This type of adder resembles the previous one in propagation of the carry. It differs from the preceding adder in that for each segment, only one repetitive type adder is used (comprising several elementary addition cells connected in series) wherein the input carry is the carry coming from the selection cell of the preceding carry. However, it is necessary to calculate the propagation function at each segment to control the corresponding selection cell. The name of this adder comes from the fact that the carry may be more quickly propagated, by a line parallel to the series adders and which is a far more rapid path than that which crosses the series of adders.

This adder has one disadvantage in relation to the preceding one: to render all its paths critical for the sum to be calculated as well as for the carry, when proceeding from low to high weight bits to be added, to increase the size of the segments (i.e., the number of elementary adders in series in each segment), then to decrease their size in the middle of the adder. Decreasing the size of the segments is actually compulsory so as to prevent the carry from being obtained too rapidly in relation to sum S.

In the optimal carry select adder, the size of the segments increases in linear progression. The time for selecting the sum varies with the hypothesis of a selection time equal to a propagation time across a full adder. In known manner, approximately $n(n+1)/2$ bits are calculated in time nT, $n^2/2$ bits are calculated in nT and n bits are calculated in $\sqrt{2nT}$ (T designating the time necessary to calculate the addition of two data bits).

In the optimal carry skip adder, the size of the segments increases in linear progression for the first half of bits to be added and then decreases in the same manner. It is said that for this type of adder, approximately n bits are calculated in a time equal to $2\sqrt{nt}$.

Generally, these two embodiments behave asymptotically at radix 2 n, and if the optimal carry skip adder is slower than the optimal carry select adder, it is, on the other hand, more economical in terms of substrate required for manufacture.

Adders using a branching system (carry look ahead adders, for example), totally repetitive, occupy considerable space which increases by n log(n) (n being the number of respective data bits to be added), while totally repetitive embodiments are very slow.

Optimal embodiments, such as the carry skip adder or the carry select adder, are an interesting compromise but are not totally satisfactory: while they require about the same surface as a carry skip adder, they cannot attain the same speed as a carry select adder.

The goal of the invention is to overcome these disadvantages and particularly to achieve an adder which uses about the same space as a carry skip adder, while at the same time performing nearly as fast as a carry look ahead adder.

As will later be seen in detail, the adder which is the subject of the invention has a novel structure termed recursive which results in a considerably elevated speed/surface ratio.

SUMMARY OF THE INVENTION

The object of the invention is a recursive type adder for calculating the sum of two operands A and B respectively formed of binary data $a_1, a_2, \ldots a_n$ and $b_1, b_2, \ldots b_n$, of varying weights, operands A and B comprising a first and a second operand AL and BL respectively formed from the low weight data and a third and fourth operand AH and BH respectively formed from the high weight data, characterized by the fact that for a recursion level NH in the adder (NH being a whole number higher than or equal to 1) and for an order K of the adder (K being an integer defining a number of elementary addition cells in a level 1 adder), this adder designated as $AD_K^{NH}$, recursively constructed of the following:

(1) a first adder $AD_{K-1}^{NH}$ of order $K-1$ and level NH constructed in recursive fashion and comprising inputs respectively receiving the first and second low weight operands AL and BL, and a first and a second output respectively furnishing a sum operand SL from the first and second low weight operands AL and BL, and an output carry bit COUT for the sum effected;

(2) a second adder $ADP_{K-1}^{NH-1}$ order $K-1$ and level $NH-1$ recursively constructed and comprising inputs respectively receiving the third and fourth high weight operands AH and BH, an input (CIN) connected to the second output (COUT) of the first adder, and a first, a second and a third output respectively furnishing a sum operand SH from the third and fourth high weight operands AH and BH, a carry propagation bit P corresponding to said sum and a carry generation bit G;

(3) a global carry selector (SE) comprising three inputs (C, G, P) respectively connected to the second output of the first adder, to the second and third outputs of the second adder, and an output providing a global output carry bit $C_{OUT}^{NH}$ resulting from the logic OR operator $$C_{OUT}^{NH} = G + P \cdot COUT;$$

According to another characteristic of the invention, the second adder $ADP_{K-1}^{NH-1}$ is constructed in recursive fashion and comprises;

(4) a third adder $ADP_{K-2}^{NH-1}$ of order $K-2$ and level $NH-2$ comprising inputs respectively receiving operands AHL and BHL respectively comprised of low weight data from the third and fourth operands AH and BH, and a carry input (CIN) connected to the second output of the first adder to receive the output carry bit (COUT) of said first adder, and first, second and third outputs respectively furnishing a sum operand (SHL) from operands AHL and BHL received at the input, a carry generation bit (G1) and a carry propagation bit (P1) from the sum effected;

a first intermediate carry selector comprising three inputs respectively connected to the second output (COUT) of the first adder, to the second output (G1) of the third adder and to the third output (P1) of the third adder, said first carry selector furnishing at one output an output carry bit C1OUT conforming to the logic equation;

$$C1OUT = G1 = P1 \cdot COUT;$$

(6) a fourth adder $ADP_{K-2}^{NH-2}$ of order $K-2$ and level $NH-2$ comprising inputs respectively receiving operands AHH and BHH respectively comprised of high impulse data from the third and fourth operands, a carry input (C2IN) connected to the output of the first selector (SES) to receive the carry output bit (C1OUT) of said selector and of the first, second and third outputs respectively furnishing a sum operand (SHH) of operands (AHH and BHH) received at the input, a carry generation bit (G2) and a carry propagation bit (P2) of the sum effected;

(7) a second intermediate carry generation selector (SEC), comprising three inputs respectively connected to the second carry generation output (G1) of the third adder, to the second carry generation output (G2) of the fourth adder and to the third carry propagation output (P2) of the fourth adder, said second selector furnishing at one output corresponding to the third output of the second adder, carry generation bit (G) of said second adder, resulting from the logic OR operator $$G = G2 + P2 \cdot G; \text{ and}$$

(8) a logic port of the "AND" type with two inputs respectively connected to the third propagation output (P2) of the fourth adder and to the third propagation output (P1) of the third adder, said logic port furnishing at the output corresponding to the second output of the second adder, output propagation bit P of said second adder, resulting from the logic multiplication $P = P1 \cdot P2$.

According to another characteristic, adder $ADP_K^1$ of order K and level 1, recursively constructed from adder $ADP_{K-1}^{NH-1}$ of order $K-1$ and level $NH-1$, capable of adding two by two bits from one level of data $a_i, a_{i+i}, \ldots, a_{i+j}, a_{i+k}$, and $b_i, b_{i+1}, \ldots b_{i+j}, b_{i+k}$ of the two operands A and B is composed of:

(1) a succession of at least K elementary addition cells, of the "full adder" type, each cell ($FA_{i+j}$) of row $i+j$ comprising two inputs to respectively receive a pair of bits such as ($a_{i+j}, b_{i+j}$), an incoming carry input to receive a carry output bit ($r_{i+j-1}$) furnished by a first outgoing carry output of a preceding elementary cell $FA_{i+j-1}$ of the said succession, the incoming carry input of the first elementary cell of the said succession receiving a bit of 0 value and the outgoing carry output of the last elementary cell of the said succession furnishing a carry generation bit (G) for said succession, each elementary cell ($FA_{i+j}$) further comprising a second and a third output respectively furnishing a local addition bit $s_{i+j}$ and a propagation bit $p_{i+j}$, bits $r_{i+j}, s_{i+j}$ and $p_{i+j}$ resulting from the logic operations $$r_{i+j} = (r_{i-j-1} \cdot p_{i+j}) + (a_{i+j} \cdot b_{i+j})$$
$$p_{i+j} = a_{i+j} \oplus b_{i+j}$$
$$s_{i+j} = a_{i+j} \oplus b_{i+j} \oplus r_{i+j-1}$$

wherein " " is the AND operator, and "+" is the OR operator and "$\oplus$" is the XOR operator.

(2) a logic carry calculating propagation unit (CP) for the adder P comprising inputs respectively connected to the third elementary cell propagation outputs ($p_{i+j}$) for furnishing at one output a propagation bit $p_{i+k}$ for said adder $ADP_K^1$ resulting from the logic operation $$P_{i+k} = P_{i+k} \cdot P_{i+k-1} \cdot \ldots \cdot p_{i+1} \cdot p_i \text{ or}$$

$$P_{i+k} = P_{i+k-1} \cdot p_{i+k}; \text{ and}$$

(3) a logic sum calculation unit (CS) comprising inputs respectively connected to two addition outputs of the elementary cells, to propagation outputs $p_{i+j} = p_{i+j-1} \cdot p_{i+j}$, and an incoming carry input CIN connected to the outgoing carry output of the preceding adder, said sum calculation unit (CS) respectively furnishing on the outputs of the addition operands $s_i, \ldots, s_{i+j}, \ldots, s_{i+k}$ calculated by adder ADP and resulting from the logic operation:

$$s_{i+j} = s_{i+j} \oplus (P_{i+j-1} \cdot CIN) \text{ with}$$

$$P_{i-1} = 1.$$

According to another characteristic, adder $AD_K^1$ of order k and level 1 comprises an adder $ADP_K^1$ of order K and level 1 wherein the input of the carry input (CIN) receives a bit (CIN) equal to 0.

Other characteristics and advantages of the invention will be apparent from the following description, taken in reference to the attached drawings.

DESCRIPTION OF THE PREFERRED EMBODIMENT

Figure 1:
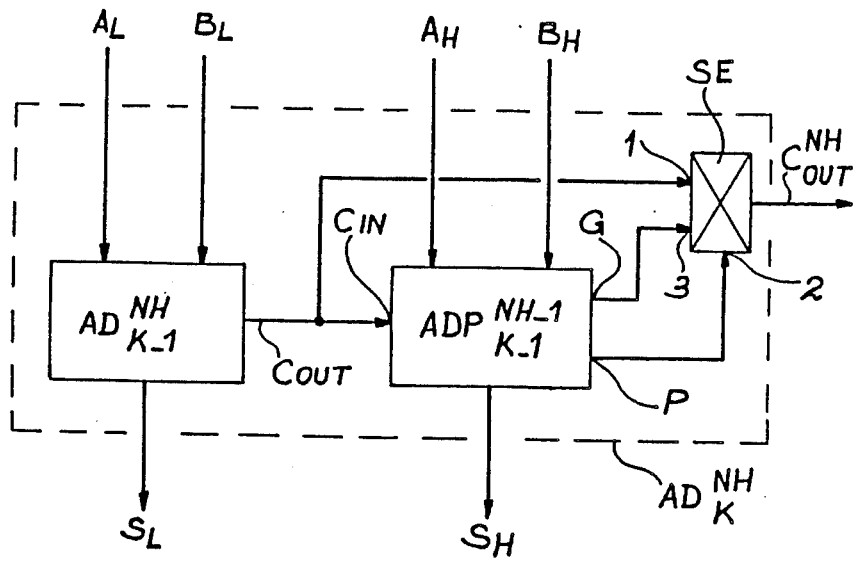
FIG. 1 is a schematic representation of an adder $AD_K^{NH}$ of level NH and order K, a recursive structure, in conformity with the invention.

Recursive structure adder $AD_K^{NH}$ schematically represented in FIG. 1, has a recursion level of NH and an order K. Order K corresponds to the number of elementary addition cells or full adders to comprise an adder of level NH=1. Level NH (NH being an integer) is actually the number of recursions necessary to construct an adder with a structure of level NH, from a structure of level NH−1, and so forth, up to level 1. Such adders have a branching structure, with the different branches comprising several series of full adders.

Adder $AD_K^{NH}$ shown in this drawing allows calculation of the sum of two operands A and B respectively formed of binary data $a_1, a_2, a_i, a_n$ and $b_1, b_2, b_i, b_n$ (with $1 \leq i \leq n$) having different weights. These two operands may themselves comprise a first and a second operand AL and BL respectively formed of low weight binary data $a_i$ and $b_i$ and of third and fourth operands, AN and BH, respectively formed of the high weight binary data $a_i$ and $b_i$.

Adder $AD_K^{NH}$ comprises, in recursive fashion, a first adder $AD_{K-1}^{NH}$ of order K−1 and level NH, which is itself recursively constructed. Said first adder comprises inputs which respectively receive the first and second low weight operands AL and BL. A first input on said first adder furnishes operand SL resulting from the sum of low weight operands AL and BL received at the input. A second output of said first adder furnishes output carry bit COUT, resulting from the addition effected.

Adder $AD_K^{NH}$ also comprises a second adder $ADP_{K-1}^{NH-1}$ order K−1 and level NH−1, also constructed in recursive fashion. Said second adder comprises inputs which respectively receive the third and fourth operands AH and BH consisting of high weight data. One input CIN of this adder, called the "incoming carry", is connected to the second output of the first adder $AD_{K-1}^{NH-1}$, to receive carry output bit COUT from the first adder. Said second adder $ADP_{K-1}^{NH-1}$ also comprises a first input which furnishes a sum operand SH from the third and fourth operands AH and BH of the high weight data received at the input. A second output of said second adder furnishes carry propagation bit P, while a third output furnishes carry generation bit G resulting from the addition.

Finally, adder $AD_K^{NH}$ comprises a carry selector SE. Said carry selector comprises three inputs 1, 2, 3 respectively connected to the second output of the first adder $AD_{K-1}^{NH}$, and to the second and third outputs of the second adder $ADP_{K-1}^{NH}$ to respectively receive bits COUT, P and G. At one output, said carry selector furnishes global carry output bit $C_{OUT}^{NH}$ from subject adder $AD_K^{NH}$.

Said global output carry bit results from the logic OR operator $C_{OUT}^{NH} = G + P \cdot COUT$ effected by selector SE and wherein the plus sign designates an "OR" and the "·" designates a logic "AND".

Figure 2:
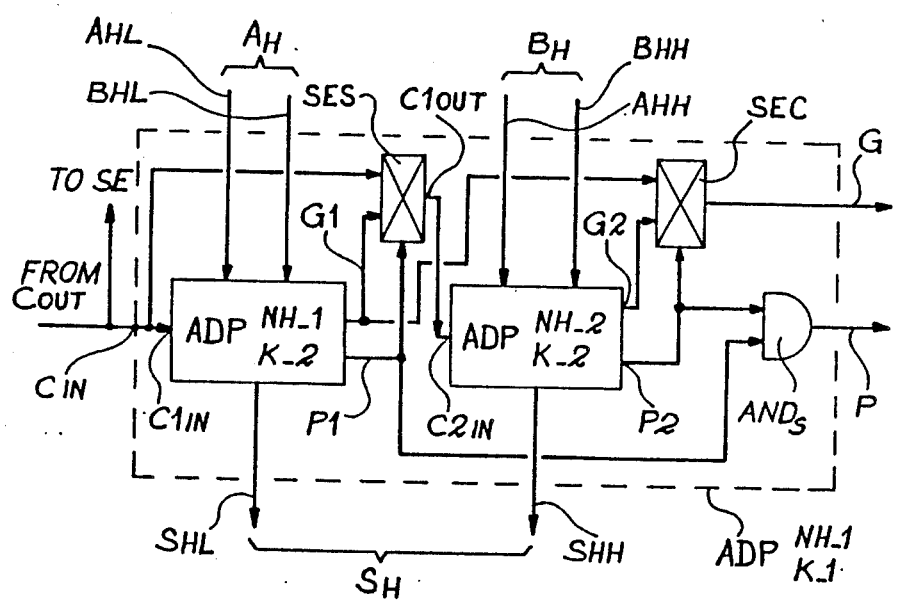
FIG. 2 is a schematic representation of one of the adders $ADP_{K-1}^{NH-1}$ of level NH−1 and order K−1, of recursive structure, belonging to the recursive structure adder of FIG. 1.

FIG. 2 is a more detailed schematic representation of the second adder $ADP_{K-1}^{NH-1}$ of order k−1 and level NH−1 of FIG. 1. This drawing will lead to a greater understanding of the recursive structure of the adder of FIG. 1. The second adder $ADP_{K-1}^{NH-1}$ which is shown in FIG. 2 is itself recursively constructed and comprises a third adder labelled $ADP_{K-1}^{NH-1}$, of order K−2 and level NH−2. Said third adder comprises inputs which respectively receive operands AHL and BHL respectively comprised of low weight data contained in third and fourth operands AH and BH. Carry bit CIN incoming from said third adder $ADP_{K-1}^{NH-1}$ described above is connected to the second output of first adder $AD_{K-1}^{NH}$ to receive carry output bit COUT from said first adder.

The third adder $ADP_{K-2}^{NH-1}$ comprises a first, second and third output which respectively furnish a sum operand SHL from operands AHL and BHL received at the input, an outgoing carry generation bit G1 and an outgoing carry propagation bit P1 from the sum effected by said third adder.

The second adder $ADP_{K-1}^{NH-1}$ also comprises a first intermediate carry selector SES comprising three inputs. These three inputs are respectively connected to the second output of the first adder $AD_{K-1}^{NH}$ and to the second and third outputs of third adder $ADP_{K-2}^{NH-1}$ to respectively receive bits COUT, G1 and P1. Said first intermediate carry selector SES furnishes at one input, carry output bit C1OUT for the addition effected by third adder $ADP_{K-2}^{NH-1}$. Said bit C1OUT results from the logic OR operator $G1 + P1 \cdot COUT$ effected by the first intermediate selector SES. As before, the plus sign "+" designates an "OR " and the "·", a logic "AND".

Finally, second adder $ADP_{K-1}^{NH-1}$ comprises a fourth adder $ADP_{K-2}^{NH-2}$ of order K−2 and level NH−2, a second intermediate selector SEC and a logic output port "AND".

The fourth adder comprises inputs respectively receiving operands AHH and BHH respectively consisting of high weight data from the third and fourth operands AH and BH described above. Input C2IN of fourth adder $ADP_{K-2}^{NH-1}$ is connected to the output of first intermediate selector SES to receive the carry output bit C1OUT furnished by said first intermediate selector.

The fourth adder also comprises first, second and third outputs which respectively furnish a sum operand SHH from input operands AHH and BHH, a carry generation bit G2 and a carry propagation bit P2 for the sum effected by said fourth adder.

Second intermediate selector SEC furnishes carry bit G, which is the carry output bit from second adder $ADP_{K-1}^{NH-1}$. Second selector SEC comprises three inputs respectively connected to the second generation output of third adder $ADP_{K-2}^{NH-1}$, to the second generation output of fourth adder $ADP_{K-2}^{NH-2}$ and to the third propagation output of the fourth adder, to respectively receive bits G1, G2 and P2. Said second intermediate selector SEC furnishes at one carry generation output, which is also the second output of the second adder $ADP_{K-1}^{NH-1}$, carry generation bit G. Said bit results from the logic OR operator $G = G2 + P2 \cdot G1$ effected by the second selector SEC wherein the plus sign "+" designates the logic operation "OR" and the "." designates the logic operation "AND".

The logic output port labeled ANDs comprises two inputs respectively connected to the third outputs of the third and fourth adders $ADP_{K-2}^{NH-1}$ and $ADP_{K-2}^{NH-2}$ for respectively receiving propagation bits P1, P2. Said logic port furnishes at one output, which corresponds to the second propagation output of second adder $ADP_{K-1}^{NH-1}$, propagation bit P. This bit is the result of the logic AND operator $P = P1 \cdot P2$.

Figure 3:
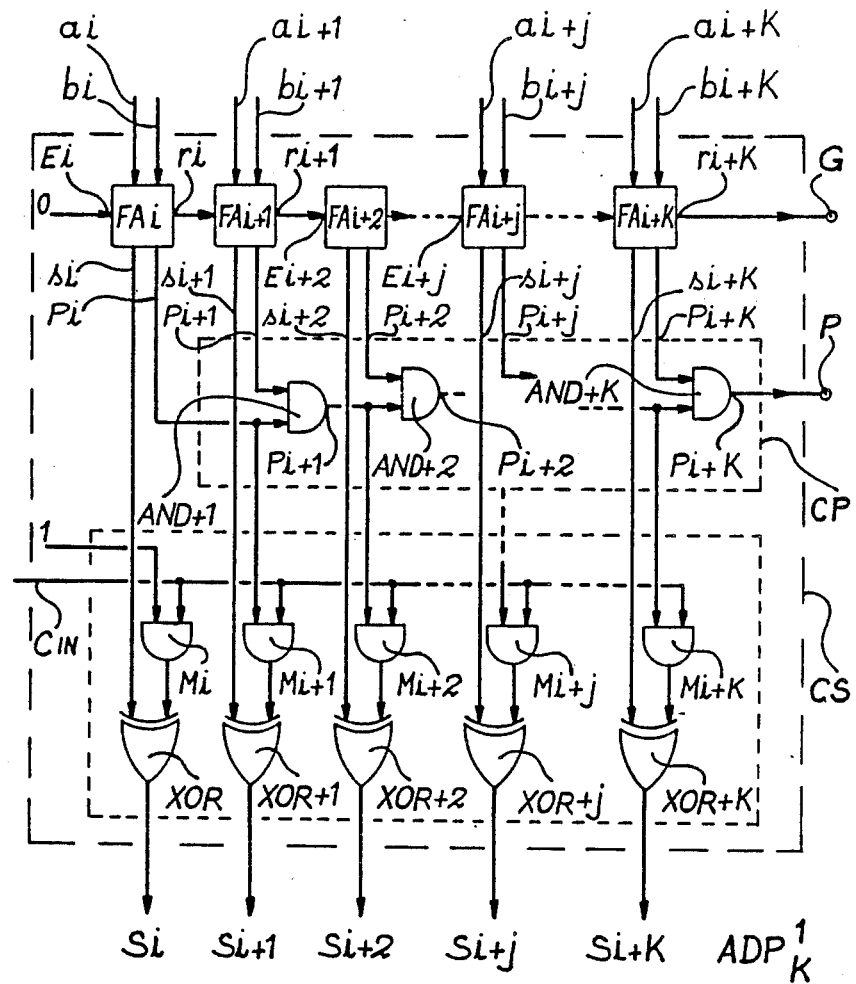
FIG. 3 is a schematic representation of an adder $ADP_K^1$ of order K and row 1, belonging to the recursive structure adder of FIG. 1.

FIG. 3 is a schematic representation of adder $ADP_K^1$ of order K and level 1. Said adder is recursively obtained from adder $ADP_{K-1}^{NH-1}$ of order K−1 and level NH−1. It is capable of adding two at a time, the bits in a segment of data $a_i, a_{i+1}, \ldots, a_{i+j} \ldots a_{i+k}$, and $b_i, b_{i+1}, \ldots b_{i+j}, \ldots b_{i+k}$, from one segment of data from two operands A and B (i being between 1 and n). This adder comprises at least K elementary addition cells, of the "full adder" type. These cells are represented by $FA_i, FA_{i+1}, FA_{i+j}, \ldots FA_{i+k}$ in the drawing. Therefore, cell $FA_1$, for example, comprises two inputs for respectively receiving bits $a_i$ and $b_j$. In the same manner, bits $a_j$ and $b_j$ are also applied to two inputs of cell $FA_{i+j}$, while bits $a_K$ and $b_K$ are applied to two inputs of cell $FA_{i+K}$.

Each elementary addition cell also comprises an incoming carry input for receiving an outgoing carry bit furnished by a first outgoing carry output from a preceding addition cell in the succession of cells. Therefore, the cell or full adder $FA_{i+j}$ comprises an input $E_{i+j}$ which receives an incoming carry bit coming from a first output of the preceding adder $FA_{i+j-1}$ (not shown in the drawing). In the same manner, one input $E_{i+2}$ of adder $FA_{i+2}$ receives an outgoing carry bit $r_{i+1}$ from a first output of the preceding adder $FA_{i+1}$.

As will later be seen in detail, input $E_i$ of incoming carry of first adder $FA_1$ of the succession receives a bit with a value of 0, while the output of the outgoing carry of the succession furnishes carry generation bit $r_{i+k} = G$ to the succession of adders.

Each elementary cell such as $FA_{i+j}$ also comprises a first and a second output which respectively furnish a local sum bit and a local propagation bit $P_{i+j}$.

In known manner for cells of full adders or Full Adders, bits $p_{i+j}, r_{i+j}, s_{i+j}$ result from the following logic operations:

$$p_{i+j} = a_{i+j-1} \oplus b_{i+j}$$
$$r_{i+j} = (r_{i+j-1} \cdot p_{i+j}) + (a_{i+j} \cdot b_{i+j})$$
$$s_{i+j} = a_{i+j} \oplus b_{i+j} \oplus r_{i+j-1}$$

In these operations, "." indicates operator "AND", "⊕" is the "XOR" operator and "+" is the "OR" operator.

Adder $ADP_K^1$ shown in the drawing also comprises a logic unit CP for calculating the propagation of the carry for this adder. This unit comprises inputs which are respectively connected to the second and third outputs of the elementary cells $FA_i, FA_{i+1}, \ldots FA_{i+j} \ldots FA_{i+k}$. Thus, this unit receives the local sum bits $s_i$, $s_{i+1}, \ldots s_{i+j} \ldots s_{i+k}$, and the local propagation bits $p_i, p_{i+1}, \ldots p_{i+k}, \ldots p_{i+k}$. At its output P it furnishes a carry propagation bit $P = K$ for said adder $ADP_{PK}^1$. This bit results from the logic AND operation:

$$P_{i+K} = R_{i+k} \cdot p_{i+K-1} \cdots \cdot p_{i+1} \cdot p_i$$

or even $$P_{i+k} = P_{i+K-1} \cdot P_{i+K}$$

The "." here indicates logic operator "AND".

The propagation calculating unit CP comprises logic "AND" type ports labeled $AND_{i+1}, AND_{i+2}, \ldots AND_{i+K}$ in the drawing. Each of these ports has two inputs. The two inputs of the first port $AND_{i+1}$ are respectively connected to the propagation outputs $p_i$ and $p_{i+1}$ of the first pair of cells $FA_i, FA_{i+1}$. Port $AND_{i+2}$ comprises two inputs respectively connected to the third propagation output p of cell $FA_{i+2}$ and to the output of preceding port $AND_{i+1}$.

In the same fashion, port $AND_{i+K}$ comprises two inputs respectively connected to the third propagation output of cell $FA_{i+K}$ and to the output of the preceding port $AND_{i+K-1}$.

Port $AND_{i+2}$, for example, then furnishes a bit $p_{i+2} = P_{i+1} \cdot p_{i+2}$ and port $AND_{i+K}$ furnishes a bit $p_{i+K} = P_{i+K-1} \cdot p_{i+j}$. Generally, it is $P_{i+j} = P_{i+j-1} \cdot p_{i+j}$. Adder $ADP_K^1$ also comprises a logic unit CS for sum calculation, which furnishes at its outputs operands $S_i$, $S_{i+1}, \ldots, S_{i+j}, \ldots, S_{i+K}$ of addition of the binary data received at the first inputs of the adder. This unit comprises inputs respectively connected to the two outputs $s_i, s_{i+1}, \ldots, s_{i+j}, \ldots, s_{i+K}$ of elementary cells $FA_i$, $FA_{i+1}, \ldots, FA_{i+j} \ldots FA_{i+K}$. This unit also comprises inputs respectively connected to propagation outputs $P_{i+1}, P_{i+2}, \ldots, P_{i+K}$ of the propagation calculation unit CP. These outputs are those of ports AND of the calculating means CP which furnish propagation bits, in the form $P_{i+j} = P_{i+j-1} \cdot p_{i+j}$. Propagation output $p_i$ of first cell $FA_i$ is connected to one of the inputs of calculating means CS, because $P_i = p_i$. This addition calculation unit CS also comprises an input CIN for incoming carrys.

The addition calculation unit CS furnishes at its outputs the sum operands of data $(a_i, b_i), (a_{i+1}, b_{i+1}), \ldots (a_{i+K}, b_{i+K})$ received at the input.

This unit effects the logic operation:

$$S_{i+j} = s_{i+j} \oplus (P_{i+j-1} \cdot CIN) \text{ by } P_{i-1} = 1.$$

The sum calculation unit CS comprises logic AND type ports $M_i, M_{i+1}, \ldots, M_{i+j}, \ldots, M_{i+K}$ with two inputs and logic "XOR" type ports $XOR_i, XOR_{i+1}, \ldots, XOR_{i+j}, \ldots, XOR_{i+K}$ with two inputs.

One input of each AND type port $M_{i+j}$ receives incoming carry bit CIN, while the other input receives propagation bit $P_{i+j}$ furnished by the corresponding output of calculation unit CP. Only the first port $M_i$ receives, on the other hand, carry input bit CIN at one input; and on the other hand, a bit having the value 1, at its other input.

(see above the relation $p_{i-1} = 1$)

The inputs of each port $XOR_{i+j}$, are respectively connected to the output of port $M_{i+j}$, thus corresponding to the second output $S_{i+j}$ of the corresponding elementary cell. Therefore, port $XOR_{i+1}$, for example, is connected to the output of port $M_{i+1}$ and output $s_{i+1}$ of elementary cell $FA_{i+1}$.

This propagation unit easily furnishes addition operands such as $S_{i+j}=s_{i+j} \oplus (P_{i+j-1} \cdot CIN)$.

For $S_{i+j}$ for example, we have:

$$S_{i+2}=s_{i+2} \oplus (P_{i+1} \cdot CIN)$$

For $ADP_K{}^1$ adders which treat segments of data bits from i through i+K (where i belongs to {1, 2, ..., n}), the number i depends upon the position of adder $ADP_K{}^1$ in the series comprising adder $AD_K{}^{NH}$. Generally, adders $ADP_K{}^1$ comprise at least k elementary addition cells.

Figure 4:
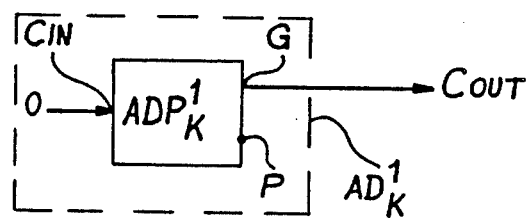
FIG. 4 is a schematic representation of an adder $AD_K^1$ of order K and row 1 deduced from the adder $AD_K^1$ of FIG. 3.

FIG. 4 is a schematic representation of adder $AD_K{}^1$ of order K and level 1. This adder, while utilizing the recursive structure above described, is in fact comprised of an $ADP_K{}^1$ adder of order K and level 1, whose incoming carry input CIN receives a bit having a value of 0. One of the outputs of this adder furnishes generation bit G, while its carry propagation output P is not connected. Original adder $AD_K{}^1$ may or may not have a non-null input CIN depending upon whether one desires a global adder with a null or non-null incoming carry.

We claim:

1. A recursive type adder for calculating the sum of two operands A and B respectively formed of binary data $a_1, a_2, \ldots a_n$ and $b_1, b_2, \ldots, b_n$ of different weights, operands A and B with a first and a second operand AL and BL respectively formed of the low weight data and a third and fourth operand AH and BH respectively formed of the high weight data, the adder having a recursion level NH, NH being an integer higher than or equal to 1, and an order K, K being an integer defining a number of elementary addition cells in a level 1 adder, being labelled $AD_K{}^{NH}$, which comprises:
   (a) a first recursive adder $AD_{K-1}{}^{NH}$ of order K−1 and level NH with inputs respectively receiving the first and second low weight operands AL and BL, and a first and a second output respectively furnishing a sum operand SL from the first and second low weight operands AL and BL, and carry output bit COUT, for the additon effected;
   (b) a second recursive adder $ADP_{K-1}{}^{NH-1}$ or order K−1 and level NH−1 with inputs respectively receiving the third and fourth high weight operands AH and BH, an input CIN connected to the second output (COUT) of the first adder and a first, a second and a third output respectively furnishing a sum operand SH from the third and fourth high weight operands AH and BH, a carry propagation bit P corresponding to said sum and a generation bit G from said carry; and
   (c) a global carry selector (SE) with three inputs (1, 2, 3) respectively connected to the second output (COUT) of the first adder and to the second and third outputs (G, P) of the second adder, and an output furnishing an outgoing global carry bit $C_{OUT}{}^{NH}$ resulting from the logic OR operations $$C_{OUT}=G+P \cdot COUT.$$

2. A recursive type adder as recited in claim 1, wherein the second recursive adder $ADP_{K-1}{}^{NH-1}$ comprises:
   (a) a third adder $ADP_{K-2}{}^{NH-1}$ of order K−2 and level NH−2 with inputs respectively receiving operands AHL and BHL respectively withlow weight data from the third and fourth operands AH and BH, and an incoming carry input (CIN) connected to the second ouput of the first adder to receive outgoing carry bit (COUT) from said first adder, and first, second and third outputs respectively furnishing a sum operand (SHL) from operands AHL and BHL received at the input, a carry generation bit (G1) and a carry propagation bit (P1) of the sum effected;
   (b) a first intermediate carry selector (SES) with three inputs respectively connected to the second output (COUT) of the first adder, to the second output (G1) of the third adder and to the third output (P1) of the third adder, said first carry selector furnishing outgoing carry bit C1OUT at one output, conforming to the logic OR operation $$C1OUT=G1+P1 \cdot COUT$$

(c) a fourth adder $ADP_{K-2}{}^{NH-2}$ of order K−2 and level NH−2 with inputs respectively receiving operands AHH and BHH respectively composed of high weight data from the third and fourth operands, anincoming carry input (C2IN) connected to the output of the first selector (SES) to receive outgoing carry bit (C1OUT) from said selector and first, second and third outputs respectively furnishing a sum operand (SHH) from the operands (AHH and BGG) received at the input, and a carry propagation operand (P2) from the sum effected;
   (d) a second intermediate carry generation selector (SEC) with three inputs respectively connected to the second carry generation output (G1) of the third adder at the second carry generation (G2) of the fourth adder and at the third carry propagation output (P2) of the fourth adder, said second selector furnishing at one output corresponding to the third output of the second adder, carry generation bit (G) of said second adder, resulting from the logic OR operation $$G=G2+P2 \cdot G1; \text{ and}$$

(e) a logic AND type port with two inputs respectively connected to the third propagation output (P2) of the fourth adder and to the third propagation output (P1) of the third adder, said logic port furnishing at one output corresponding to the second output of the second adder, propagation output bit P from said second adder, resulting from the logic AND operation $P=P1 \cdot P2$.

3. A recursive type adder as recited in claim 2, wherein recursive adder $ADP_K{}^1$ of order K and level 1, capable of adding two bits at the same time from a set of binary data $a_i, a_{i+1}, \ldots, a_{i+j}, \ldots, a_{i+K}$, and $b_i, b_{i+1}, \ldots, b_{i+j}, b_{i+K}$ from the two operands A and B, i being between 1 and n, which comprises:
   (a) a cascade of at least K elementary addition cells for the "full adder" type, each cell ($FA_{i+j}$) in a row i+j with two inputs respectively receiving a pair of bits such as ($a_{i+j}, b_{i+j}$), an incoming carry input to receive outgoing carry bit ($r_{i+j-1}$) furnished by a first outgoing carry output of a preceding elementary cell $FA_{i+j-1}$ of said cascade, the incoming carry input of the first elementary cell in said cascade receiving a bit of 0 value and the outgoing carry output of the last elementary cell of said cascade furnishing a carry generation bit (G) for said cascade, each elementary cell ($FA_{i+j}$) further including a second and a third output respectively furnishing local sum bit $s_{i+j}$ and a propagation bit $P_{i+j}$, bits $r_{i+j}$, $s_{i+j}$ resulting from the logic operations $$r_{i+j} = (r_{i+j-1} \cdot P_{i+j}) + (a_{i+j} \cdot b_{i+j})$$
$$P_{i+j} = a_{i+j} \oplus b_{i+j}$$
$$s_{i+j} = a_{i+j} \oplus b_{i+j} \oplus r_{i+j-1}$$

wherein "." is the AND operator, "+" is the OR operator and "⊕" is the XOR operator;

(b) a logic unit (CP) for carry propagation P for said adder with inputs respectively connected to the three propagation outputs $(p_{i+j})$ of the elementary cells to furnish at one output propagation bit $p_{i+k}$ for said adder $ADP_K^1$ resulting from the logic operation $$P_{i+k} = p_{i+k} \cdot p_{i+k-1} \cdot \ldots \cdot p_{i+1} \cdot p_1$$
or
$$P_{i+k} = P_{i+k-1} \cdot p_{i+k};\text{ and}$$

(c) a logic OR calculation unit (CS) with inputs respectively connected to the second addition outputs of the elementary cells, to propagation outputs $p_{i+j}$ of the propagation unit (CP) furnishing bits $p_{i+j} = p_{i+j-1} \cdot p_{i+j}$, and an incoming carry input CIN connected to the outgoing carry output of a preceding adder, said addition calculation unit respectively furnishing summing operand $s_i, \ldots, s_{i+j}, \ldots, s_{i+K}$ at some outputs, calculated by adder $ADP_K$ and resulting from the logic operation $$s_{i+j} = s_{i+j} \oplus (P_{i+j-1} \cdot CIN)$$

with $$P_{i-1} = 1.$$

4. A recursive type adder as cecited in claim 3, wherein the adder $AD_K^1$ of order K and level 1 is composed of an adder $ADP_K^1$ of order K and level 1 and the input of the incoming carry (CIN) receives a bit (CIN) equal to 0.

* * * * *

UNITED STATES PATENT AND TRADEMARK OFFICE
CERTIFICATE OF CORRECTION

Page 1 of 2

PATENT NO. : 4,942,549
DATED : July 17, 1990
INVENTOR(S) : Francis JUTAND & Luc MONTPERRUS It is certified that error appears in the above-identified patent and that said Letters Patent is hereby corrected as shown below:

In Col. 11, line 37, "AD $_{K-1}$ NH" should be --AD$_{K-1}^{NH}$--.

In Col. 11, line 42, "additon" should be --addition--.

In Col. 11, line 43, "ADP$_{K-1}$$^{NH-1}$" should be --ADP$_{K-1}^{NH-1}$--.

In Col. 11, line 58, "C$_{OUT}$$^{NH}$" should be --C$_{OUT}^{NH}$--.

In Col. 11, line 63, "ADP$_{K-1}$$^{NH-1}$" should be --ADP$_{K-1}^{NH-1}$--.

In Col. 11, line 65, "ADP$_{K-2}$$^{NH-1}$" should be --ADP$_{K-2}^{NH-1}$--.

In Col. 11, line 67, "withlow" should be --with low--.

In Col. 12, line 19, "ADP$_{K-2}$$^{NH-2}$" should be --ADP$_{K-2}^{NH-2}$--.

In Col. 12, line 23, "anincoming" should be --an incoming--.

UNITED STATES PATENT AND TRADEMARK OFFICE
CERTIFICATE OF CORRECTION

Page 2 of 2

PATENT NO. : 4,942,549
DATED : July 17, 1990
INVENTOR(S) : Francis JUTAND & Luc MONTPERRUS It is certified that error appears in the above-identified patent and that said Letters Patent is hereby corrected as shown below:

In Col. 12, line 51, "$ADP_K^1$" should be --$ADP_K^1$--.

In Col. 13, line 2, after "$S_{i+j}$" insert --and $P_{i+j}$--.

In Col. 13, line 16, "$ADP_K^1$" should be --$ADP_K^1$--.

In Col. 14, line 19, "$ADP_K^1$" should be --$ADP_K^1$--.

In Col. 14, line 20, "$ADP_K^1$" should be --$ADP_K^1$--.

Signed and Sealed this

Third Day of September, 1991

Attest:

HARRY F. MANBECK, JR.

Attesting Officer

Commissioner of Patents and Trademarks